Patented May 8, 1934

1,957,555

UNITED STATES PATENT OFFICE 1,957,555

LACTOBACILLI CONCENTRATE

John Reichel and Harry A. Cheplin, Philadelphia, Pa., assignors to Sharp & Dohme, Inc., Philadelphia, Pa., a corporation of Maryland No Drawing. Application June 10, 1931, Serial No. 543,388

14 Claims. (Cl. 167—73)

This invention relates to lactobacilli concentrates, and more particularly to acidophilus bacilli concentrates, and comprises such concentrates in a stabilized form, stabilized from the standpoint of viability of the bacilli. The invention includes the new stable concentrates and the method of stabilization.

The lactobacilli used in making the new stable concentrates can be advantageously prepared by the process described in U. S. Letters Patent No. 1,540,951 by digesting milk or casein with a ferment, such as trypsin, reinforced with certain other nutritive or growth factors, such as peptone, dextrin and calcium carbonate, and by growing the lactobacilli in such specially prepared culture medium which encourages the rapid growth of viable lactobacilli in much higher concentration than that attained or obtained in milk, whey or ordinary laboratory media, such as plain or glucose broth. The lactobacilli are separated by settling or centrifuging so that a very small amount of recovered or harvested mass of lactobacilli, for example, about 2 grams, will contain the number of viable lactobacilli obtained in a quart of fermented acidophilus milk, for example, about one thousand billion lactobacilli.

The lactobacilli, recovered or harvested by settling or centrifuging, as above described, appear as a plastic, sticky mass of clay-like or putty-like consistency, light brown or grayish-brown in color, and acid in reaction, the pH value being approximately 3.0 to 4.5.

The lactobacilli mass thus obtained is relatively unstable, and the loss of viability of the lactobacilli is relatively rapid and progressively increases upon ageing, even under favorable temperature conditions. This rapid loss of viability of the lactobacilli limits the extent to which the lactobacilli can be shipped to distant places and limits the time during which the mass of lactobacilli can be stored after harvesting, and requires that the lactobacilli mass be used within a relatively short time after it is harvested, or that the lactobacilli mass be mixed with or incorporated into some suitable vehicle while such mass is fresh or within a limited period of time, usually not over 24 hours, from the time of recovery or harvesting of the lactobacilli.

We have found that the mass of lactobacilli, freshly recovered or harvested in an unstable state, can be stabilized by treatment of the mass of lactobacilli with suitable neutralizing or buffering agents, and that a definite stability in the life or viability of the lactobacilli can be thereby obtained.

The neutralizing or buffering agents which we have found particularly advantageous are sterile milk and milk of magnesia in the proportions of about ⅓ to ½ pound of sterile milk and 40 to 60 cc. of milk of magnesia per pound of lactobacilli mass, produced as above described. The freshly harvested mass of lactobacilli has a high acidity and it also contains toxic by-products of metabolism adhering to or surrounding the individual bacterial cells. The addition of neutralizing or buffering agents serves to reduce or neutralize the high acidity and to buffer the mass of bacilli. Instead of using sterile milk, other liquids can be used which will similarly dilute the mass of bacilli to make it somewhat more liquid. Water, for example, can be used, or fruit juices containing various salts and which have a buffering effect. Instead of milk of magnesia, other suitable neutralizing agents can be employed, but we have found the caustic alkalies and carbonates, such as caustic soda or sodium carbonate, less advantageous than milk of magnesia. When milk is used as a diluent it also serves to supply buffering agents.

The incorporation of the neutralizing or buffering agents with the lactobacilli can be accomplished by thorough agitation or mixture, preferably by gentle rotary motion or agitation for a sufficient period of time, for example, for about ½ hour to 1 hour.

The incorporation of the neutralizing or buffering agents with the mass of lactobacilli converts the thick plastic or putty-like mass into a thick viscous liquid which contains the lactobacilli in the form of a stable concentrate. The stability in the viability of the lactobacilli in the concentrate appears to be achieved by the beneficial effect exerted by the sterile milk and the milk of magnesia upon the lactobacilli in neutralizing the acids and other metabolic by-products toxic to the bacterial cell which generates them, and finally buffering the entire medium to such a point of complete chemical stability as to preserve the viability of the lactobacilli for a considerable period of time. For example, while the freshly prepared and unstabilized mass of lactobacilli must ordinarily be used or incorporated in some suitable vehicle within a period of about 24 hours, the stabilized concentrate of the present invention preserves the viability of the lactobacilli for a much longer period of time, for example, from 6 to 10 days or longer if kept under favorable temperature conditions, for example, around 33 to 40° F.

The new stable concentrate, with the viability of the lactobacilli preserved, can be shipped to relatively distant places and can be kept for a week or more before use, without the rapid loss of viability of unstabilized masses of lactobacilli. The stabilized concentrate thus provides a valuable form of lactobacilli which can be kept for considerable periods of time and shipped to distant points without rapid loss of viability.

The lactobacilli which we have found particularly valuable when stabilized in accordance with the present invention are the acidophilus bacilli. The acidophilus concentrate will contain in a few grams of the concentrate, for example, around 2 to 4 grams, the number of viable lactobacilli or acidophilus bacilli obtained in a quart of fermented acidophilus milk, for example, about a thousand billion acidophilus bacilli. The stabilized acidophilus concentrate can be administered directly or consumed directly, and only a few grams of the concentrate is required when the concentrate is thus consumed or taken directly. Instead of consuming it directly it can advantageously be mixed or taken with vehicles or beverages and it forms a valuable concentrate for mixing with beverages and liquids and vehicles of various kinds. It is thus a valuable concentrate for adding to sweet milk or other milk products to give an acidophilus milk which, with the addition of a very few grams of the concentrate to a quart of sweet milk will nevertheless give an acidophilus milk containing a number of acidophilus bacilli comparable with that contained in a quart of cultured milk, for example, a thousand million acidophilus bacilli per cubic centimeter, although a smaller number may be incorporated in the milk, for example, around two hundred million per cubic centimeter. The new stable concentrate also forms a valuable material for incorporating with fruit and vegetable juices thereby giving acidophilized beverages containing an acidophilus content comparable with that of cultured acidophilus milk while retaining the natural taste and flavor of the fruit or vegetable juices or beverages.

It is one of the advantages of the present invention that the stable character of the concentrate enables the concentrate to be shipped as a concentrate without rapid loss of viability so that the concentrate can be administered directly several days after its production. The concentrate can thus be shipped in a concentrated form and added to milk or to fruit or vegetable juices or other beverages for immediate consumption, thereby making it possible for the consumer to form his own acidophilized beverage. Moreover, the stabilized concentrate is a valuable concentrate for incorporating with sweet milk or with certain fruit and vegetable juices or beverages to give acidophilized sweet milk or acidophilized fruit or vegetable juices or beverages which likewise can be kept for considerable periods of time without the rapid loss of viability of ordinary cultured acidophilus milk.

It will thus be seen that the present invention provides a new and valuable product which is of signal utility in the execution of lactobacillus therapy, enabling the lactobacilli to be prepared and shipped and kept in a stabilized form, and providing a concentrate which in itself can be administered in small doses, for example, about 2 grams, or a concentrate which can be administered in the form of fruit or vegetable juices impregnated with the concentrate to the extent, for example, of 1 to 2 grams or more per liter of such fluid vehicles. The stabilized concentrate is also of value in the art of acidophilizing sweet milk and other milk products and of acidophilizing fruit and vegetable juices and other beverages for the reason that its stability in preserving the viability of the lactobacilli permits the handling, storing, shipping and dispensing of the product on a large scale over a wide area not heretofore possible with unstabilized lactobacilli masses.

We claim:

1. The method of producing a stabilized lactobacilli concentrate, which comprises separating the lactobacilli from the culture medium in the form of a mass of lactobacilli and incorporating therein neutralizing and buffering agents to form a buffered highly concentrated suspension of lactobacilli, the extent of neutralization being such that the concentrate is stabilized against rapid loss of viability, thereby enabling the stabilized concentrate to be kept for considerable periods of time.

2. The method of producing a stabilized acidophilus bacilli concentrate, which comprises separating the acidophilus bacilli from the culture medium in the form of a mass of acidophilus bacilli and incorporating therein neutralizing and buffering agents to form a buffered highly concentrated suspension of acidophilus bacilli, the extent of neutralization being such that the concentrate is stabilized against rapid loss of viability, thereby enabling the stabilized concentrate to be kept for considerable periods of time.

3. The method of producing a stabilized lactobacilli concentrate, which comprises separating the lactobacilli from the culture medium in the form of a mass of lactobacilli and incorporating therein neutralizing and buffering agents to form a buffered highly concentrated suspension of lactobacilli, such treatment including the addition of milk of magnesia as a neutralizing and buffering agent.

4. The method of producing a stabilized acidophilus bacilli concentrate, which comprises separating the acidophilus bacilli from the culture medium in the from of a mass of acidophilus bacilli and incorporating therein neutralizing and buffering agents to form a buffered highly concentrated suspension of acidophilus bacilli, such treatment including the addition of milk of magnesia as a neutralizing and buffering agent.

5. The method of producing a stabilized acidophilus bacillus concentrate, which comprises separating the acidophilus bacilli from the culture medium in the form of a plastic mass, adding thereto and incorporating therewith sterile milk and milk of magnesia in the proportions of about ⅓ to ½ pound of sterile milk and 40 to 60 cc. of milk of magnesia per pound of the mass of bacilli to form a buffered highly concentrated suspension of acidophilus bacilli.

6. A stabilized lactobacilli concentrate comprising a highly concentrated suspension of lactobacilli, said concentrate being stabilized by admixture therewith of neutralizing and buffering agents, the neutralizing agent being present in an amount such that the concentrate is stabilized against rapid loss of viability, thereby enabling the stabilized concentrate to be kept for considerable periods of time.

7. A stabilized lactobacilli concentrate in the form of a highly concentrated suspension of lactobacilli of which a few grams or cubic centimeters contain approximately the same number of lactobacilli as are present in one quart of cultured or fermented lactobacilli milk, said concentrate being stabilized by admixture therewith of neutralizing and buffering agents, the neutralizing agent being present in an amount such that the concentrate is stabilized against rapid loss of viability, thereby enabling the stabilized concentrate to be kept for considerable periods of time.

8. A stabilized lactobacilli concentrate in the form of a thick heavy viscous liquid or suspension of lactobacilli in a medium neutralized and containing buffering agents to preserve the stability and viability of the organisms, the extent of the neutralization of the medium being such that the concentrate is stabilized against rapid loss of viability, thereby enabling the stabilized concentrate to be kept for considerable periods of time.

9. A stabilized acidophilus bacilli concentrate comprising a highly concentrated suspension of acidophilus bacilli, said concentrate being stabilized by admixture therewith of neutralizing and buffering agents, the neutralizing agent being present in an amount such that the concentrate is stabilized against rapid loss of viability, thereby enabling the stabilized concentrate to be kept for considerable periods of time.

10. A stabilized acidophilus bacilli concentrate in the form of a highly concentrate suspension of acidophilus bacilli of which a few grams or cubic centimeters contain approximately the same number of acidophilus bacilli as are present in one quart of cultured or fermented acidophilus bacilli milk, said concentrate being stabilized by admixture therewith of neutralizing and buffering agents, the neutralizing agent being present in an amount such that the concentrate is stabilized against rapid loss of viability, thereby enabling the stabilized concentrate to be kept for considerable periods of time.

11. A stabilized acidophilus bacilli concentrate in the form of a thick heavy viscous liquid or suspension of acidophilus bacilli in a medium neutralized and containing buffering agents to preserve the stability and viability of the organisms, the extent of the neutralization of the medium being such that the concentrate is stabilized against rapid loss of viability, thereby enabling the stabilized concentrate to be kept for considerable periods of time.

12. A stabilized lactobacilli concentrate in the form of a thick heavy viscous liquid or suspension of lactobacilli in a medium neutralized with milk of magnesia and containing buffering agents to preserve the stability and viability of the organisms.

13. A stabilized acidophilus bacilli concentrate in the form of a thick heavy viscous liquid or suspension of acidophilus bacilli in a medium neutralized with milk of magnesia and containing buffering agents to preserve the stability and viability of the organisms.

14. A stabilized acidophilus bacilli concentrate in the form of a thick heavy viscous liquid or suspension of acidophilus bacilli in a medium neutralized with about 40 to 60 cc. of milk of magnesia per pound of the acidophilus bacillus mass and having admixed therewith about ⅓ to ½ pound of sterile milk per pound of the bacillus mass.

JOHN REICHEL.
HARRY A. CHEPLIN.